United States Patent [19]

van der Lely et al.

[11] 4,339,004
[45] Jul. 13, 1982

[54] SOIL COMPACTING ROLLERS

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 141,062

[22] Filed: Apr. 17, 1980

[30] Foreign Application Priority Data

May 8, 1979 [NL] Netherlands .......................... 7903571

[51] Int. Cl.³ ............................................. A01B 29/04
[52] U.S. Cl. .................................... 172/537; 172/68; 172/609
[58] Field of Search ............... 172/537, 539, 518, 536, 172/68, 609, 540, 548, 547; 404/132

[56] References Cited

U.S. PATENT DOCUMENTS

| 1,098,757 | 6/1914 | Rasmussen | 172/537 |
|---|---|---|---|
| 1,177,558 | 3/1916 | Whittlesey | 172/537 X |
| 1,798,393 | 3/1931 | Anderson | 172/537 X |
| 2,513,165 | 6/1950 | Gilreath | |
| 2,537,802 | 1/1951 | Thomas | 172/548 |
| 2,538,167 | 1/1951 | Schmeiser | 172/537 X |
| 3,192,838 | 7/1965 | Cook | 404/132 |
| 3,338,315 | 8/1967 | Ketel | 172/537 |
| 3,897,830 | 8/1975 | Lely | 172/68 |
| 4,126,186 | 11/1978 | Lely | 172/169 |

FOREIGN PATENT DOCUMENTS

498728 12/1953 Canada .............................. 172/537

Primary Examiner—Richard J. Johnson
Attorney, Agent, or Firm—William B. Mason

[57] ABSTRACT

A soil compacting roller comprises a cylinder rotatably mounted between the lower ends of substantially vertical limbs of two side supports. The cylinder is surrounded by a plurality of larger diameter rings which extend in relatively spaced apart, side-by-side relationship along the length of the cylinder. The roller also includes an internal tubular or rod supporting member spaced above the cylinder so that the rings are rotatable about that member and the cylinder entirely independently of one another. Guide members extend between the successively neighboring rings to keep them in position axially of the cylinder and to assist in dislodging adhering mud from the interiors and exteriors of the rings. The guide members can be in the form of pivotally mounted strips, spring steel rods, annular flanges carried at regular intervals along the cylinder, pairs of lugs carried by the supporting member or rotatably mounted circumferentially toothed discs which extend between the successive rings. In one embodiment, each ring is of annular, rather than cylindrical, formation. Also, the roller can be used in combination with a rotary harrow or a rotary cultivator having a plurality of soil working members that are rotatable about substantially horizontal axis.

17 Claims, 12 Drawing Figures

SOIL COMPACTING ROLLERS

This invention relates to soil compacting rollers of the kind which comprise at least one cylinder which is freely rotatable about a substantially horizontal axis that extends substantially perpendicular, or at least transverse, to the intended direction of operative travel of the roller, the or each cylinder being surrounded by a plurality of larger diameter rings which lie in relatively spaced side-by-side relationship along the axial length(s) of said cylinder(s).

Known rollers of this kind include at least one cable or other flexible but inextensible member arranged to interconnect the rings, the latter surrounding a pair of similar or identical freely rotatable cylinders with which the rings co-operate during operation. The interconnection of the rings prevents them from moving entirely independently of one another and this has proved to be disadvantageous with some soils, particularly heavy soils in a wet condition, since the known rollers tend to become smothered and/or internally clogged with mud under these circumstances.

An object of the present invention is to avoid, or very considerably to reduce, the disadvantages of known rollers of the kind set forth above and, in particular, to provide rollers that are very versatile as regards the nature and condition of soil with which they will deal successfully. Accordingly, the invention provides a soil compacting roller of the kind set forth, wherein a bodily fixed supporting member is provided which extends internally of said rings in spaced relationship with said at least one cylinder, the rings being movable entirely independently of one another.

For a better understanding of the invention, and to show how the same may be carried into effect, reference will now be made, by way of example, to the accompanying drawings, in which.

Figure 1:
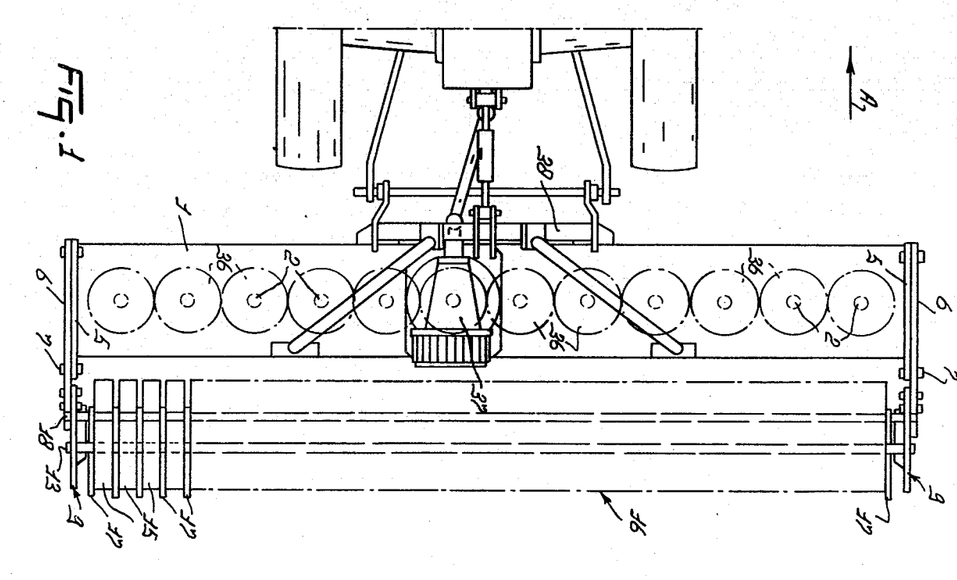
FIG. 1 is a plan view of a soil cultivating implement incorporating a roller in accordance with the invention that is arranged to serve a depth control function, the implement being shown connected to the rear of an agricultural tractor.
Figure 2:
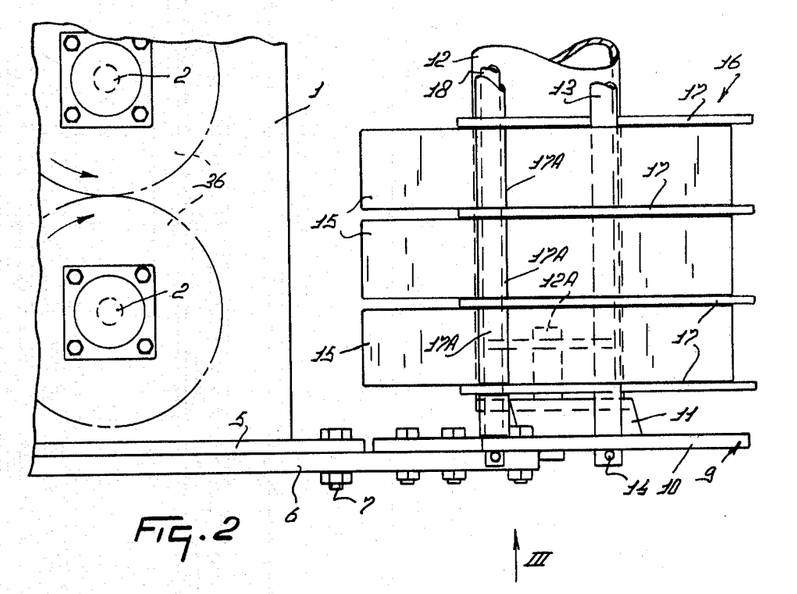
FIG. 2 is a plan view, to a considerably enlarged scale, showing one end of the implement and of its roller in greater detail.
Figure 3:
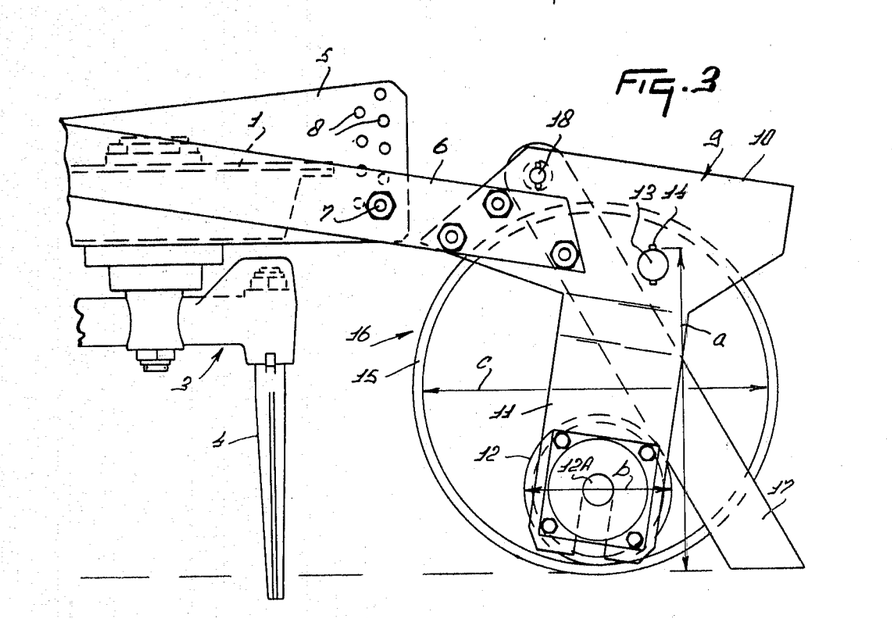
FIG. 3 is a side elevation as seen in the direction indicated by an arrow III in FIG. 2, FIGS. 4 and 5 are similar views to those of FIGS. 2 and 3 but illustrate an alternative embodiment of a roller in accordance with the invention.

Referring to FIGS. 1 to 3 of the accompanying drawings, those Figures illustrate a soil cultivating implement in the form of a rotary harrow which harrow comprises a hollow box-section frame portion 1 that extends substantially horizontally transverse, and usually (as illustrated) substantially horizontally perpendicular, to the intended direction of operative travel of the harrow which is indicated by an arrow A in FIG. 1 of the drawings. A plurality (in this case, twelve) of non-horizontal shafts 2 are rotatably mounted in the hollow frame portion 1 in a single row with their parallel longitudinal axes spaced apart from one another at regular intervals which advantageously, but not essentially, have magnitudes of substantially 250 millimeters. The shafts 2 are usually vertically or substantially vertically disposed and each shaft 2 projects downwardly from beneath the bottom of the hollow frame portion 1 where it is firmly but releasably provided with a corresponding soil working member 3 (FIG. 3). Each rotary soil working member 3 comprises a substantially horizontally disposed support whose center has a hub that is releasably secured to the lowermost end of the respective shaft 2, the opposite ends of said support being provided with holders in which soil working means in the form of two diametrically opposed rigid tines 4 are firmly but releasably arranged in such a way that soil working portions of said tines 4 project downwardly from their holders into the ground when the implement is in use.

The opposite ends of the hollow frame portion 1 are closed by substantially vertical side plates 5 that are parallel to one another and parallel or substantially parallel to the direction A, each side plate 5 projecting rearwardly behind the remainder of the frame portion 1 with respect to the direction A and being so shaped as to become progressively larger in vertical extent towards its rearmost extremity (see FIG. 3). The two side plates 5 are provided at their tops and fronts, with respect to the direction A, with corresponding strong pivots which are substantially horizontally aligned in a direction that is parallel to the transverse length of the hollow frame portion 1 and each pivot has the leading end of a corresponding rearwardly extending arm 6 turnably mounted thereon so that said arm 6 can be moved upwardly or downwardly alongside the adjoining plate 5. The portions of the two side plates 5 which project rearwardly beyond the remainder of the hollow frame portion 1, with respect to the direction A, are each formed with two adjacent rows of holes 8, the holes 8 in each row being spaced by the same distance from the axis which is defined by the pivotal mountings of the arms 6 but the holes in the two rows being staggered as regards their angular positions about said axis. Each arm 6 is formed with two holes which are at the same distances from the axis that has just been mentioned as are corresponding ones of the two rows of holes 8 and locking bolts 7 are provided for entry through chosen holes 8 and appropriate ones of the holes in the arms 6 so that, when said bolts 7 are tightened, the arms 6 will be very firmly, but releasably, retained in a corresponding angular setting about their pivotal connection to the frame portion 1 via its side plates 5. Each arm 6 projects rearwardly, with respect to the direction A, beyond the rearmost extremity of the corresponding frame portion side plate 5, the projecting end portion thereof being firmly but releasably secured to a corresponding support 9 by three bolts. As can be seen in FIG. 3 of the drawings, each support 9 is approximately, but certainly not exactly, T-shaped when seen in side elevation, the leading end of its substantially horizontal cross-bar 10 being the part thereof that is secured to the respective arm 6 by the corresponding three bolts. Each support 9 also comprises a substantially vertically disposed upright 11 which projects downwardly from the lower edge of the respective cross-bar 10 at a location that is substantially midway along the length of that cross-bar 10.

A lower end region of the upright 11 of each support 9 carries the housing of a corresponding horizontal bearing and horizontal stub shafts 12A which are mounted axially at the opposite ends of a cylinder 12 are received in those bearings in a freely rotatable manner. A supporting member in the form of a rod 13 of circular cross-section extends substantially horizontally parallel to the axis of rotation of the cylinder 12 and the transverse length of the hollow frame portion 1 at a location which is towards the lower edge of the cross-bar 10 of each support 9 and a little nearer to the rear of that support 9 than it is to the front thereof. The opposite ends of the rod 13 are entered through holes formed in the two supports 9 and retaining pins 14 are entered through transverse holes formed in the short portions of the rod 13 that project outwardly beyond the relatively remote sides of the two supports 9. If preferred, the supporting member may be in the form of a circular cross-section tube rather than in the form of the circular cross-section rod 13.

A plurality of plain rings 15 are arranged in relatively spaced side-by-side relationship around the cylinder 12 and around the rod 13 or other supporting member. It is preferred that the rings 15 should be formed from a synthetic plastics material but this is by no means essential and they may be formed from an alternative material, such as a metal. The axial width of each ring 15 in a direction that is parallel to the longitudinal axis of the cylinder 12 and to the transverse longitudinal axis of the hollow frame portion 1 is preferably substantially one-tenth of its external diameter. The cylinder 12 and the rod 13 afford spaced supports for the plurality of rings 15 which surround them. As seen in FIG. 3 of the drawings, the vertical distance a between the top of the rod 13 and the ground surface is preferably 350 millimeters whereas the internal diameter of each plain ring 15 is preferably 400 millimeters. As seen in plan view (FIG. 2), the cylinder 12 is principally, but not wholly, in advance of the rod 13 with respect to the direction A, the external diameter b (FIG. 3) of said cylinder 12 preferably being 165 millimeters.

The cylinder 12, the supporting member which is afforded by the rod 13 and the rings 15 together constitute a soil compacting roller which is generally indicated by the reference 16 and which is located to the rear of the rotary soil working members 3 of the implement with respect to the direction A. The level of the roller 16 relative to the hollow frame portion 1 and its rotary soil working members 3 is adjustable by moving the arms 6 upwardly or downwardly about their pivotal connections to the frame portion side plates 5 in the manner described above using the locking bolts 7 to retain any angular setting of the arms 6 that may be chosen for as long as may be required. It will be appreciated that, in practice, this adjustment varies the maximum depth of penetration of the tines 4 of the soil working members 3 into the soil which is possible when the implement is in operation and it is noted that FIG. 3 of the drawings shows the arms 6 occupying such a position of adjustment that the tines 4 penetrate into the soil to the minimum extent which is possible for the particular implement which is being described by way of example. A plurality of guide members in the form of strips 17 are arranged at the opposite ends of the roller 16 and between its successively neighbouring plain rings 15. Each strip 17 occupies an obliquely upwardly extending position and has its leading (with respect to the direction A) upper end pivotally mounted on a carrier rod 18 which extends parallel to the longitudinal axis of the cylinder 12 and to the rod 13 at a location which is close to the top and to the leading end of the cross-bars 10 of the two supports 9 with respect to the direction A, the opposite ends of said carrier rod 18 being entered through holes in the two supports 9 and being furnished with retaining pins that have the same function as the previously mentioned retaining pins 14. The strips 17 are maintained in substantially their appointed positions along the length of the carrier rod 18, to match the positions of the rings 15, by a plurality of spacing bushes or sleeves 17A which turnably surround the external surface of the carrier rod 18. It is noted that, as seen in plan view (FIG. 2), the carrier rod 18 is located in vertical register with the front of the cylinder 12 and would be located in advance of that cylinder 12 when viewed in the same direction in a different position of adjustment of the arms 6 relative to the side plates 5. The arrangement is such that the obliquely disposed strips 17 have their leading edges in engagement with the curved surface of the freely rotatable cylinder 12 and their rear edges spaced by a short distance from the rod 13. Each strip 17 is freely pivotable about the carrier rod 18 between a position in which its leading edge bears against the cylinder 12 and a position in which its rear edge bears against the rod 13. Each strip 17 has such a length that its lowermost end projects downwardly and rearwardly beyond the or each immediately neighbouring ring 15, said lower end terminating in a bevelled edge (FIG. 3) which will be horizontally or substantially horizontally disposed during the operation of the implement depending upon the particular position of adjustment of the arms 6 relative to the frame portion side plates 5 which exists at that time. Again as seen in FIG. 3 of the drawings, a vertical plane which contains the longitudinal axis/axis of rotation of the cylinder 12 is in advance of the rod 13 relative to the direction A but this is not essential and the illustrated construction may be varied to provide embodiments in which the longitudinal axis of the rod 13 is contained in the vertical plane that has just been mentioned or is in advance of that plane relative to the direction A. When the preferred dimensions of the parts of the roller 16 which are mentioned above are adopted, each ring 15 preferably has a width in the axial direction of that ring of substantially 80 millimeters.

Figure 4:
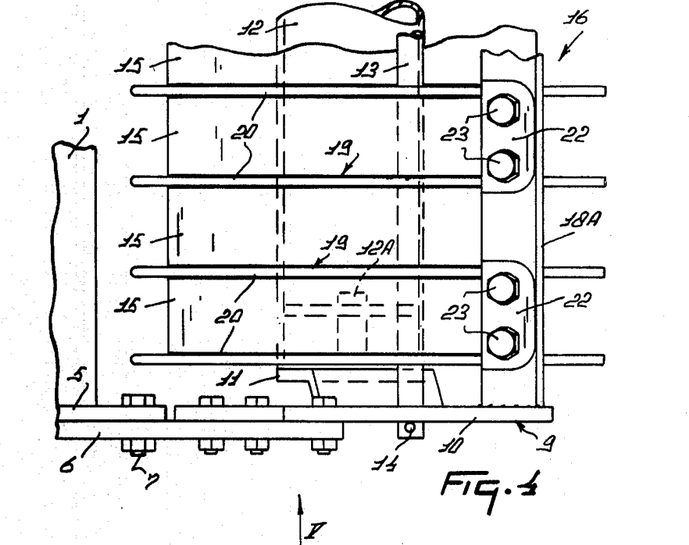
Figure 5:
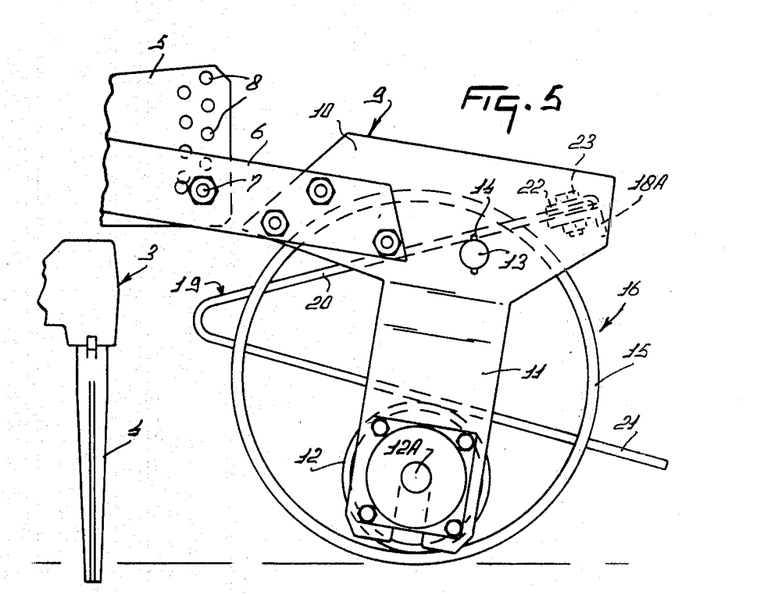

FIGS. 4 and 5 of the drawings illustrate a construction in which a plurality of spring steel rods 19 take the place of the strips 17 of FIGS. 1 to 3 of the drawings. A support 18A of L-shaped cross-section extends parallel to the longitudinal axis/axis of rotation of the cylinder 12 and to the rod 13 between the two supports 9 and has its opposite ends welded or otherwise rigidly secured to the relatively facing sides of the cross-bars of those two supports 9 at locations which are close to the rear thereof with respect to the direction A. The spring steel rods 19 serve the same function as the strips 17 in maintaining the rings 15 in spaced apart relationship with one another and in their appointed positions along the axial length of the cylinder 12. Each rod 19 comprises a straight portion 20 which extends obliquely downwardly and forwardly with respect to the direction A from the support 18A to a location which is in front of the or each immediately neighbouring ring 15 relative to the same direction where it merges by way of a tight bend having an angular magnitude of substantially 150° into a second straight portion 21 that extends obliquely downwardly and rearwardly with respect to the direction A to have its free rearmost end located behind the or each immediately neighbouring ring 15. It will be noted that, approximately midway along its length, each of the second straight portions 21 bears downwardly against a top region of the curved surface of the freely rotatable cylinder 12. The rods 19 are formed in integral pairs, a transverse connecting portion between the upper rear ends of the two straight portions 20 of each such integral pair being secured to the top of the broader limb of the support 18A by a shaped clamping plate 22 and two bolts 23.

Figure 6:
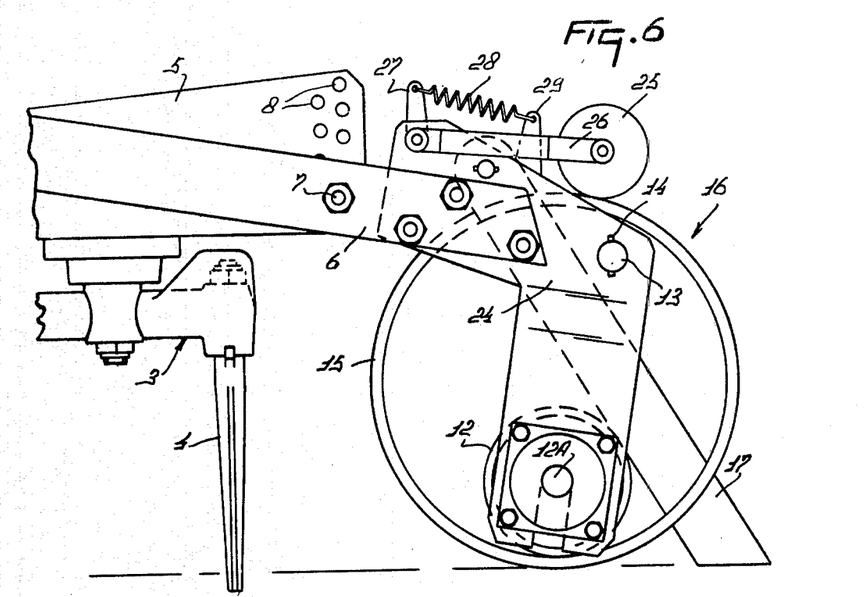
FIG. 6 is a side elevation similar to FIG. 5 but illustrating a third form of roller in accordance with the invention.

The side elevation of FIG. 6 of the drawings illustrates a further alternative embodiment in which the previously described supports 9 are replaced by two supports 24 that are approximately, but not exactly, of inverted L-shaped configuration as seen in FIG. 6. Thus, each support 24 has a generally horizontal limb from the rearmost end of which, with respect to the direction A, a substantially vertical limb projects downwardly to carry the substantially horizontal bearing for the corresponding cylinder stub shaft 12A towards its lower end. A rearmost end region of each arm 6 is firmly but releasably secured to the substantially horizontal limb of the corresponding support 24 by three bolts. As seen in FIG. 6 of the drawings, the substantially vertical limb of each support 24 is inclined downwardly and forwardly from the horizontal limb thereof at a frew degrees to the vertical but it will be appreciated that this disposition will be changed if the bolts 7 are arranged to cooperate with different and higher ones of the holes 8. The same parts 12, 13, 14 and 15 of the roller 16 are employed as have already been described with reference to FIGS. 1 to 3 of the drawings and those parts accordingly do not require to be described again. However, in this embodiment, the rings 15 of the roller 16 are caused, during operation, to exert a predetermined pressure upon the ground surface by a spring-loaded counter roller 25 that has an axial length which is such that it will bear downwardly from above against substantially the top of all of the rings 15 of the roller 16. The counter roller 25, which may be a solid or hollow cylinder, is freely rotatable about its own longitudinal axis, its opposite ends being turnably connected by small bearings to the rearmost ends of corresponding arms 26. Each arm 26 is pivotally connected to the substantially horizontal limb of the corresponding support 24 at a location near to the leading end and to the upper edge of that limb and, at the opposite side of said limb from the arm 26, said arm is rigidly coupled, via the pivot, to a much shorter upwardly projecting lever 27. A helical tension spring 28 is stretched between an eye at the upper end of each lever 27 and an eye at the upper end of a corresponding bracket 29 that projects upwardly from the upper edge of the horizontal limb of the support 24 concerned. It will be appreciated that the tension springs 28 urge the counter roller 25 downwardly into contact with the tops of the rings 15. Simple known or other means (not shown) may, if desired, be provided to enable the tension of the two springs 28 to be adjusted. It will be noted that, as seen in FIG. 6 of the drawings, the lines of contact between the counter roller 25 and the rings 15 substantially register with the longitudinal axes of the substantially vertical limbs of the two supports 24 and therefore exactly register with, or are close to, the regions of contact of the rings 15 with the ground surface.

Figure 7:
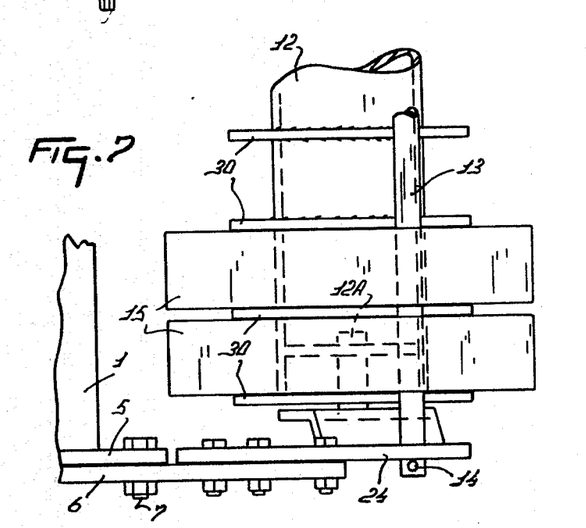
FIG. 7 is a plan view that is similar to FIGS. 2 and 4 but illustrates a fourth form of roller in accordance with the invention.

FIG. 7 illustrates, in plan view, an alternative embodiment in which the cylinder 12 is provided at regular intervals along its length with annular flanges 30, each annular flange 30 having a thickness in the direction of the longitudinal axis/axis of rotation of the cylinder 12 which corresponds to the desired spacing between the rings 15. The general plane of each flange 30 is perpendicular to the longitudinal axis of the cylinder 12 and the diameter thereof is such that the distance between its lowermost extremity and the top of the rod 13 is greater than the internal diameter c (FIG. 3) of each ring 15. This arrangement ensures that each ring 15 is always flanked by two relatively projecting flanges 30 so that said flanges 30 continuously maintain the rings 15 in their appointed relatively spaced relationship while allowing each of those rings 15 to move freely within appointed limits. The flanges 30 again act as guide members and serve the same function as the previously described strips 17 or spring steel rods 19. It will be realised that, during operation, the flanges 30 will tend to produce a corresponding number of parallel grooves in the surface of the worked soil that all extend in the direction A. This is also true, to a lesser extent, of the strips 17.

Figures 8, 9, 10, 11:
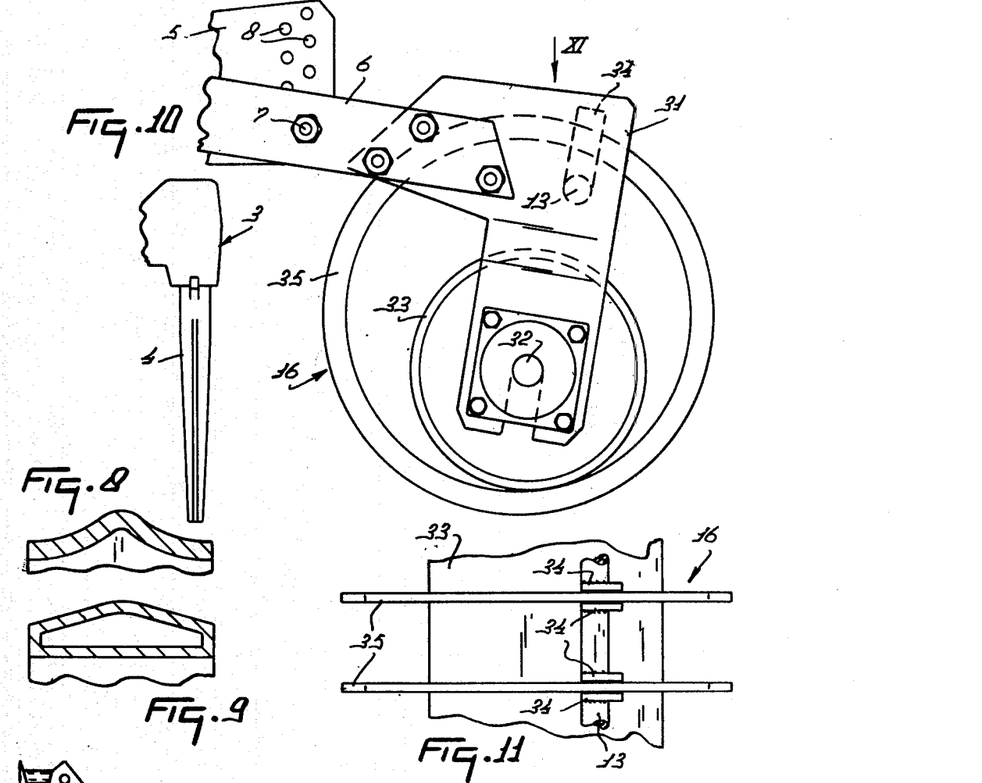
FIGS. 8 and 9 are scrap cross-sectional elevations, to an enlarged scale, illustrating alternative embodiments of part of a roller in accordance with the invention.
FIG. 10 is a side elevation that is similar to FIGS. 3, 5 and 6 but that illustrates a fifth form of a roller in accordance with the invention.
FIG. 11 is a plan view as seen in the direction illustrated by an arrow XI in FIG. 10.

It is not essential that the rings 15 should have a plain circular cylindrically curved outer surface and FIG. 8 of the drawings is a scrap cross-section, to an enlarged scale, through an alternative one of said rings as seen in a tangential direction. It will be apparent that the use of rings 15 having the cross-sectional shape that can be seen in FIG. 8 of the drawings will, during operation of the implement of which the roller 16 forms a part, produce upon the surface of the compacted soil a shallow grooved appearance, the number of grooves corresponding to the number or rings 15 which are provided and each groove being formed by the radially outward central or substantially central projection of each ring that lies between the opposite axial sides/ends thereof as shown in FIG. 8. FIG. 9 of the drawings illustrates, to the same scale and from the same standpoint as FIG. 8, a further alternative formation for each ring 15. In the embodiment of FIG. 9, each ring is hollow presenting a plain radially inner surface and a shallow V-shaped radially outer surface. This radially outer surface will, during operation, again produce a somewhat grooved effect in the surface of the compacted soil but a comparison between FIG. 9 and FIG. 8 of the drawings will show that the grooved effect will be less pronounced when the rings of FIG. 9 are used rather than the rings of FIG. 8. The hollow interior of each ring 15 of FIG. 9 may be filled with a material which will increase the weight of the ring, water being a suitable liquid material but other materials also being effective. It will be remembered that the rings 15 are preferably produced from a synthetic plastics material and, with this formation, a "filler" hole can readily be provided in the radially internal wall of each ring 15 and be screwthreaded to receive a recessed closing plug. If preferred, rings 15 in accordance with FIG. 9 of the drawings may be permanently filled with a material designed to increase their weight in which case no "filler" hole is necessary.

FIGS. 10 and 11 of the drawings illustrate an embodiment in which the rear end region of each arm 6 has a support 31 firmly but releasably secured to it by three bolts, the support 31 being basically similar to the supports 24 of FIGS. 6 and 7 of the drawings but the substantially horizontal limb thereof being differently shaped. The substantially vertical limb of each of the two supports 31 will, as illustrated, usually be inclined downwardly and forwardly, with respect to the direction A, to some extent, a plain right circular cylinder 33 having axial stub shafts 32 at its opposite ends being freely rotatably mounted between substantially horizontally aligned bearings carried towards the lowermost ends of said substantially vertical limbs in much the same manner as has already been described previously in connection with the cylinder 12. However, the cylinder 33 has a larger external diameter than does the previously described cylinder 12, the external diameter of the cylinder 33 preferably being substantially 250 millimeters. The supporting member which is afforded by the rod 13 or equivalent tube is again provided to interconnect the substantially horizontal limbs of the two supports 31, its longitudinal axis being parallel to the axis of rotation of the cylinder 33 that is embodied in its stub shafts 32. The rod 13 is provided with a plurality of pairs of lugs 34 that project from said rod 13 in a direction that is parallel to the upright length of the substantially vertical limb of each support 31. An annular (i.e. planar) ring 35 passes between the two lugs 34 of each pair and surrounds both the rod 13 and the external surface of the cylinder 33, there being a plurality of the annular rings 35 that extend throughout substantially the whole of the working width of the roller 16 in regularly spaced apart relationship with one another. As can be seen in FIG. 10 of the drawings, the distance between the upper end of each pair of lugs 34 and the lowermost extremity of the external surface of the cylinder 33 is greater than the internal diameter of each annular ring 35 so that, during operation, said rings 36 cannot become dislodged from between the corresponding pair of lugs 34 which lugs thus act as guide members. The general plane of each freely rotatable annular ring 35 is substantially vertically disposed and, in the embodiment which is being described, said rings are spaced apart from one another in the axial direction of the roller 16 by distances of substantially 80 millimeter.

Each of the shafts 2 is provided, inside the hollow frame portion 1, with a corresponding straight-toothed or spur-toothed pinion 36 (FIG. 1), the twelve (in this embodiment) pinions 36 being arranged in a single row with the teeth of each pinion in mesh with those of the or each of its immediate neighbours in the row. One of the center pair of shafts 2 in the row of twelve such shafts has an upward extension through the top of the hollow frame portion 1 into a gear box 37 that is fastened to the top of the hollow frame portion 1. The gear box 37 has a forwardly projecting rotary input shaft which can be placed in driven connection with the rear power take-off shaft of an agricultural tractor or other operating vehicle through the intermediary of a telescopic transmission shaft, which is of a construction that is known per se, having universal joints at its opposite ends. This arrangement is illustrated somewhat diagrammatically in FIG. 1 of the drawings from which it will be noted that the rear of the gear box 37 is provided with a change-speed gear by which the transmission ratio between the rotary input shaft of the gear box 37 and a shaft that is in driving connection with the aforementioned upwardly extended shaft 2 can be varied. The construction of the change-speed gear does not form the subject of the present invention but it is noted that its purpose is to enable the speed of rotation of the soil working members 3 to be increased or decreased, as may be required, without having to change the speed of rotation that is applied to the rotary input shaft of the gear box 37.

The front of the hollow frame portion 1, with respect to the direction A, is provided with a coupling member or trestle 38 that is of substantially triangular configuration as seen in front or rear elevation. The coupling member or trestle 38 lies midway between the planes of the frame portion side plates 5 and is constructed and arranged to enable the implement to be connected to the three-point lifting device or hitch at the rear of the same agricultural tractor or other operation vehicle whose power takeoff shaft drives the soil working members 3. This basically known form of connection is illustrated somewhat diagrammatically in FIG. 1 of the drawings and it will be noted that downwardly and rearwardly divergent tie beams connect locations close to the apex of the coupling member or trestle 38 to widely spaced apart locations at the top and rear of the hollow frame portion 1 for strengthening purposes.

In the use of the soil cultivating implement/rotary harrow that has been described, its coupling member or trestle 38 is connected to the three-point lifting device or hitch at the rear of an agricultural tractor or other operation vehicle and the power takeoff shaft at the rear of that vehicle is placed in driving connection with the rotary input shaft of the gear box 37 by way of the aforementioned known telescopic transmission shaft which has universal joints at its opposite ends. Adjustments which may, if necessary, be made before work commences include raising or lowering the roller 16 relative to the frame portion 1 and its soil working members 3 to control the maximum depth to which the tines 4 of those members 3 can penetrate into the ground and varying the transmission ratio in the change-speed gear at the back of the gear box 37 to increase or decrease the speed of rotation of the members 3. These adjustments will usually be made having regard to the nature and conditions of the soil that is to be dealt with and the particular purpose for which that soil is required after treatment. As the soil cultivating implement/rotary harrow moves forwardly in the direction A over soil that is to be cultivated and subsequently compacted by the roller 16, the soil working members 3 in the row of twelve such members will rotate in the successively opposite directions that are indicated by arrows in FIG. 2 of the drawings due to the intermeshing arrangement of the pinions 36 and each member 3 will work a corresponding strip of soil that extends parallel to the direction A. However, since the diametrically opposed tines 4 of each member 3 are spaced apart from one another by a little greater distance than the spacing between the successive shafts 2 (preferably substantially 250 millimeters), said strips will overlap one another to produce, in effect, a single broad strip of worked soil having, in the case of the particular example that is being described, a width of substantially 3 meters. The implement/harrow is supported from the ground surface by the freely rotatable cylinder of the roller 16 through the intermediary of its plain rings 15 which rings, during operation, will occupy substantially the positions that are shown in FIG. 3, FIG. 5 or FIG. 6 of the drawings. Under these circumstances, the internal surfaces of the rings 15 remain substantially constantly free of contact with the supporting member that is afforded by the rod 13 or equivalent tube and are caused to revolve by their contact with the soil and with the internally disposed cylinder 12. Each ring 15 thus revolves about a substantially horizontal axis that is located substantially midway between the rod 13 and the axis of rotation of the cylinder 12. The presence of the guide members which are afforded by the parts 17, 19 or 30 in the embodiments of FIGS. 1 to 7 of the drawings, ensures that the rings 15, which are movable to a considerable extent, do not foul one another in their movement and tend to maintain optimum positions for compacting the soil. The guide members also tend to shed adhering soil from between the rings 15 and to scrape off soil adhering to the cylinder 12 in the embodiments of FIGS. 1 to 6.

The supporting member that is afforded by the rod 13 or an equivalent tube limits the downward movement of the rings 15 or annular rings 35 which is possible so that, even when the implement/harrow is raised clear of the ground for inoperative transport purposes, said rings 15 or 35 will maintain their appointed relatively spaced positions axially along the roller 16 and will immediately resume their working positions when the roller 16 regains contact with the ground surface. A large proportion of the interior of the roller 16 is empty space so that it need not be heavy in weight relative to its size although, of course, the weight may be deliberately increased for some purposes when using rings 15 in accordance with FIG. 9 of the drawings as described above. Even when it has a considerable axial length, the directly supported parts of the roller 16 maintain adequate rigidity and it has been found that, due to the provision of the supporting member that is afforded by the rod 13 or by an equivalent tube, together with the independent movability of the separate rings 13 or 35, the roller 16 is effective in compacting soils of different types, which vary considerably in moisture content, the roller 16 tending not to become externally smothered, nor internally clogged, with mud when working in wet and heavy soil so that the tedious and dirty cleaning operations which frequently need to be undertaken with known rollers under such conditions are substantially, if not completely, avoided.

In the embodiment of FIGS. 10 and 11 of the drawings, the compacting of the soil is brought about principally by the freely rotatable cylinder 33 which cylinder, it will be remembered, has a considerably larger diameter than does the cylinder 12 of the preceding embodiments. Adhesion of mud to the cylinder 33 for any length of time is substantially prevented, in the embodiment of FIGS. 10 and 11 of the drawings, by the annular rings 35 which rings are individually rotatable around the cylinder 33 with their inner edges making contact with the external surface of the cylinder 33 when the implement of which the roller 16 forms a part is in use. It is noted that, in the embodiment of FIG. 6 of the drawings, a single counter roller 25 has been described to cooperate with all of the rings 15. However, this is by no means essential, and, if preferred, a plurality, such as four, of substantially horizontally aligned and individually spring-loaded counter rollers may be provided for co-operation with corresponding groups of the rings 15.

Figure 12:
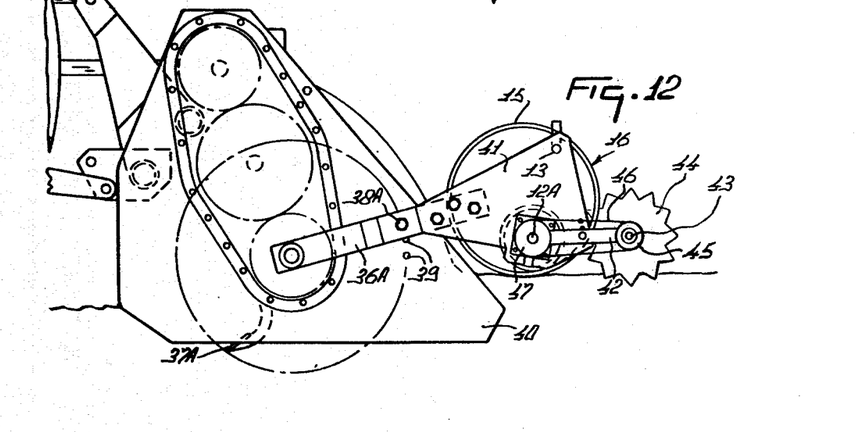
FIG. 12 is a side elevation showing a soil cultivating implement in the form of a rotary cultivator, the implement being provided at the rear with a sixth form of roller in accordance with the present invention.

FIG. 12 of the drawings illustrates a soil cultivating implement in the form of a rotary cultivator. The cultivator has two arms 36A which both project generally rearwardly relative to the intended direction of operative travel of the cultivator from the opposite ends of a substantially horizontally disposed central shaft which carries a plurality of bladed soil working members 37A which, during operation, are rotatable around the axis of that central shaft. FIG. 12 of the drawings diagrammatically illustrates only one of the bladed soil working members 37A but shows, by way of a broken line, the skeletal cylindrical figure which is traced by a large number of those members 37A during their rotation about the axis of the central shaft. The arms 36A are connected to the opposite ends of the central shaft in such a way as to be turnable upwardly and downwardly about the axis of that shaft. However, substantially vertically disposed side plates 40 of the cultivator are formed with curved rows of holes 39 in each of which rows the holes 39 are equidistant from the longitudinal axis of the central shaft which directly or indirectly carries the bladed soil working members 37A. Each arm 36A is formed with at least one hole at the same distance from said axis and locking bolts 38A can be entered through chosen holes 39 and through the co-operating holes in the arms 36A to maintain those arms firmly but releasably in chosen angular settings about the axis of the central shaft. A rear end region of each arm 36A has a corresponding substantially triangular support 41 firmly but releasably secured to it by three bolts and one of the previously described rollers 16 is arranged between said supports 41 so as to extend substantially horizontally parallel to the central shaft which directly or indirectly carries the bladed soil working members 37A. The rod 13 or equivalent tube extends between the two supports 41 at a location close to the uppermost corners of those substantially triangular supports.

In this embodiment, each of the stub shafts 12A at the opposite ends of the cylinder 12 has the leading end of a corresponding rearwardly projecting arm 42 mounted thereon so that said arm 42 can be turned upwardly or downwardly about that stub shaft 12A, as may be required. Means which is basically similar to the locking bolts 38A and co-operating holes 39 is provided to secure each arm 42 firmly but releasably in a corresponding angular setting about the axis of rotation of the cylinder 12 which is embodied in its stub shafts 12A, this means being shown in outline in FIG. 12 and including curved rows of holes formed close to the rearmost edges of the two supports 41. The arms 42 project rearwardly to positions behind the roller 16 and their rearmost ends carry substantially horizontally aligned bearings in which a substantially horizontally disposed carrier shaft 43 is rotatably mounted. The carrier shaft 43 is provided at regular intervals along its length with a plurality of toothed discs 44 which are so disposed that their toothed peripheries project forwardly into the gaps between the rings 15 of the roller 16. One end of the carrier shaft 43 carries a sprocket wheel 45 and an endless transmission chain 46 places that sprocket wheel 45 in driven communication with a larger sprocket wheel 47 that is fastened to the stub shaft 12A at the corresponding end of the cylinder 12. The transmission ratio between the larger sprocket wheel 47 and the smaller sprocket wheel 45 is such that, during operation when the cylinder 12 is rotated by contact with the soil through the intermediary of the rings 15, the carrier shaft 43 and its toothed discs 44 are caused to rotate at a faster speed than is said cylinder 12.

The operation of the roller 16 of FIG. 12 of the drawings is much the same as that of any of the previously described rollers 16 which include the rings 15. However, in this case, the toothed discs 44 afford guide members for the rings 15, said discs serving to shed any soil which may collect internally of the rings 15. The upward and downward adjustability of the arms 42 relative to the supports 41 enables the effective level of the discs 44 to be adjusted relative to the effective level of the roller 16 so that said discs 44 will co-operate with that roller 16 in governing the maximum depth of penetration of the bladed soil working members 37A of the rotary cultivator into the ground which is possible during operation.

Although a roller in accordance with the invention has been described only in combination with soil working implements of two different kinds, it is emphasised that it is possible for a roller in accordance with the invention to be combined with other agricultural implements and, indeed, for it to be used alone, when provided with a simple supporting structure, to provide a soil compacting facility that is not combined with any other implement.

Although certain features of the soil compacting roller embodiments which have been described, and/or that are illustrated in the accompanying drawings, will be set forth in the following claims as inventive features, it is emphasised that the invention is not necessarily limited to those features, and that it includes within its scope each of the parts of each soil compacting roller embodiment that has been described and/or that is illustrated in the accompanying drawings both individually and in various combinations.

We claim:

1. A soil compacting roller comprising a plurality of rings that are rotatable about a substantially horizontal axis, said rings being positioned in side-by-side relationship and being independently movable with respect to each other during operation, a carrier with bearing means supporting said rings, said bearing means including an upper fixed supporting member and a lower cylinder, said supporting member and said cylinder being spaced apart a substantial distance from one another and extending through the openings in said rings, the openings in said rings being generally in alignment and said supporting member being located at a higher level than said cylinder, said horizontal axis being located between the supporting member and said cylinder, said carrier including an elongated support that extends above and along the length of the roller, a plurality of guide members depending from said elongated support and said rings being separated by said guide members, said guide members extending between said supporting member and said cylinder to terminate in lower free ends.

2. A roller as claimed in claim 1, wherein said guide members are strips and each strip extends upwardly and forwardly from rear to front.

3. A roller as claimed in claim 1, wherein each guide member comprises two straight and relatively inclined portions, said portions being interconnected by a tight bend that is located in advance of said rings, one of said portions extending downwardly and rearwardly from said bend, the other portion extending upwardly and rearwardly, away from said bend.

4. A roller as claimed in claim 3, wherein the upwardly and rearwardly inclined portions of said guide members are secured to said support, the downwardly and rearwardly inclined portions extending between neighboring rings and bearing against an upper region of said cylinder.

5. A roller as claimed in claim 1, wherein each guide member is inherently resilient.

6. A roller as claimed in claim 1, wherein pressure means is mounted to urge said rings against the ground surface and increase the ground pressure of said roller.

7. A roller as claimed in claim 6, wherein each ring is hollow and its hollow interior is filled with a substance that increases the weight of said roller.

8. A roller as claimed in claim 6, wherein said pressure means comprises at least one spring-loaded counter roller that co-operates with the upper region of at least one of said rings.

9. A soil contacting roller comprising a plurality of rings that are rotatable about a substantially horizontal axis, said rings being positioned in side-by-side relationship and being independently movable with respect to each other during operation, internal bearing means supporting said rings, said bearing means including an upper fixed rod-like supporting member and a lower cylinder, said rod-like supporting member and said cylinder being spaced apart a substantial distance from one another and extending through the openings in said rings, the openings in said rings being generally in alignment, said horizontal axis being located between said supporting member and said cylinder, the distance between the top of said rod-like supporting member and the lowermost extremity of the cylinder being greater than the radius of at least one of said rings, guide members depending from carrier means positioned above said roller and said guide members being arranged between adjacent rings to separate same from one another, said guide members comprising parts which extend obliquely downwardly and rearwardly with respect to the direction of roller travel.

10. A roller as claimed in claim 9, wherein, as seen in plan view, the supporting member is located to the rear of said cylinder with respect to the normal direction of roller travel.

11. A roller as claimed in claim 9, wherein said cylinder is an elongated right circular cylinder having stub shafts at its opposite ends, said shafts defining an axis of rotation for said roller.

12. A roller as claimed in claim 9, wherein the opposite ends of said supporting member are releasably connectable to side supporting guides of said roller.

13. A roller as claimed in claim 9, wherein the diameter of at least one of said rings is about two-and-a-half times the diameter of said cylinder.

14. A soil contacting roller comprising a plurality of rings that are rotatable about a substantially horizontal axis, said rings being positioned in side-by-side relationship and being independently movable with respect to each other during operation, internal bearing means supporting said rings, said bearing means including an upper fixed rod-like supporting member and a lower cylinder, said rod-like supporting member and said cylinder being spaced apart a substantial distance from one another and extending through the openings in said rings, the openings in said rings being generally in alignment, said horizontal axis being located between said supporting member and said cylinder, the distance between the top of said rod-like supporting member and the lowermost extremity of the cylinder being greater than the radius of at least one of said rings, guide members, said guide members being arranged between adjacent rings to separate same from one another, said guide members having upper ends that are pivoted to an elongated carrier support that is positioned above said roller.

15. A roller as claimed in claim 14, wherein the longitudinal axis of each ring extends parallel to the longitudinal axis of rotation of said cylinder, the axial length of each ring being substantially one-tenth of its diameter.

16. A roller as claimed in claim 15, wherein the external surface of said ring is profiled.

17. A soil contacting roller comprising a plurality of rings that are rotatable about a substantially horizontal axis, said rings being positioned in side-by-side relationship and being independently movable with respect to each other during operation, internal bearing means supporting said rings, said bearing means including an upper fixed rod-like supporting member and a lower cylinder, said rod-like supporting member and said cylinder being spaced apart a substantial distance from one another and extending through the openings in said rings, the openings in said rings being generally in alignment, said horizontal axis being located between said supporting member and said cylinder, the distance between the top of said rod-like supporting member and the lowermost extremity of the cylinder being greater than the radius of at least one of said rings, guide members depending from a common carrier and being freely pivotable with respect to said carrier, said guide members being arranged between adjacent rings to separate same from one another, said carrier being located in advance of said cylinder and said guide members bearing against an upper surface of the cylinder, said guide members having lower and rearmost ends that project outwardly beyond said rings.

* * * * *